United States Patent [19]

Newton

[11] Patent Number: 4,854,558

[45] Date of Patent: Aug. 8, 1989

[54] SOUND DEADENER FOR WINDOW COUNTERBALANCE SPRING

[75] Inventor: William P. Newton, Spencerport, N.Y.

[73] Assignee: Caldwell Manufacturing Company, Rochester, N.Y.

[21] Appl. No.: 216,224

[22] Filed: Jul. 7, 1988

[51] Int. Cl.⁴ ............ F16F 9/00; F16F 1/36; E05D 13/00; B32B 15/00

[52] U.S. Cl. .................. 267/74; 16/197; 16/DIG. 6; 118/63; 267/148; 267/166; 428/379

[58] Field of Search .......... 267/33, 166, 166.1, 267/167, 174, 70–74, 148, 149, 182, 286; 16/197, DIG. 6, DIG. 16, DIG. 36, DIG. 42; 428/379; 181/208, 294, 296; 427/348, 178, 208.2; 118/63

[56] References Cited

U.S. PATENT DOCUMENTS

| | | | |
|---|---|---|---|
| 2,851,721 | 9/1958 | Decker et al. | 16/197 |
| 3,478,384 | 11/1969 | Skolnik | 16/197 |
| 4,104,426 | 8/1978 | Gonzalez et al. | 181/294 X |
| 4,204,022 | 5/1980 | Snyder et al. | 181/290 X |
| 4,540,070 | 9/1985 | Yonovich et al. | 267/141 X |
| 4,753,423 | 6/1988 | Ukai et al. | 267/286 |
| 4,778,642 | 10/1988 | Lee et al. | 427/348 X |

FOREIGN PATENT DOCUMENTS

| | | | |
|---|---|---|---|
| 0097333 | 6/1984 | Japan | 267/166 |
| 1341409 | 9/1987 | U.S.S.R. | 267/167 |

Primary Examiner—Robert J. Oberleitner
Attorney, Agent, or Firm—Stonebraker, Shepard & Stephens

[57] ABSTRACT

A window counterbalance spring (10, 30) enclosed within a spring cover (35) or tube (25) is sound deadened against rattling by having its outer surface (16) coated with a hot melt adhesive (11). Hot melt (11) is preferably sprayed on outer surface (16) of the spring, at it is wound; and for rotationally tensioned springs (10) surrounding twisted rods (20), some hot melt is deposited on the interior (17) of the spring to cushion its vibration against the twisted rod.

17 Claims, 2 Drawing Sheets

4,854,558

SOUND DEADENER FOR WINDOW COUNTERBALANCE SPRING

BACKGROUND

Window counterbalance springs, which are ordinarily enclosed within spring covers or tubes, often rattle in response to vibration. This can occur while the balance operates as the windows are raised and lowered; and it can be caused by passing trucks, wind, and slamming doors, for example.

Since rattling of window counterbalance springs is annoying, many expedients have been tried to keep the springs quiet. Flocking spring surfaces with fibers is one possibility that is expensive and only partially solves the problem. For tension springs enclosed within spring covers of jamb liners, sound deadeners can be mounted on the spring to center it within the cover, as suggested in U.S. Pat. No. 4,540,070. This involves separately molded parts that must be assembled onto each spring. For rotationally tensioned springs extending around twisted rods and contained within metal tubes, greases have been used to fill the spring tube and keep the spring quiet. The greases cause problems, however. In the warmest summer weather, they tend to leak out of the spring tubes; and in the coldest winter weather, they stiffen and impair the spring action.

I have devised a low cost and effective way of sound deadening window counterbalance springs. My way of deadening spring noise is inexpensive to apply and very effective in result, without suffering the problems involved in previous ways of deadening spring noise.

SUMMARY OF THE INVENTION

My way of deadening a rattle sound made by a window counterbalance spring enclosed within a spring cover or tube involves spraying a hot melt thermoplastic adhesive on the spring. The hot melt is sprayed against an outer surface of the convolutions of the spring, preferably when the spring is being wound, so that the adhesive adheres to the outer surface of the spring. There it is disposed to deaden the sound of any rattling of the spring within its surrounding cover or tube. Preferably, the adhesive spray is broken into a multitude of filaments that interlace with each other over the outer surface of the spring. This is done by air jets directed around the adhesive spray to make it whirl around as it contacts the spring. For rotationally tensioned springs disposed around a twisted rod, some of the interlaced filaments of hot melt adhesive are allowed to enter through gaps between the spring convolutions to deaden rattle sounds occurring between the inner surface of the spring and the twisted rod. Sound deadening for the interior of the spring can also be accomplished by spraying a bead of the hot melt adhesive through a gap between the convolutions so that the bead adheres to the inner surface of the spring.

DRAWINGS

DETAILED DESCRIPTION

Figure 1:
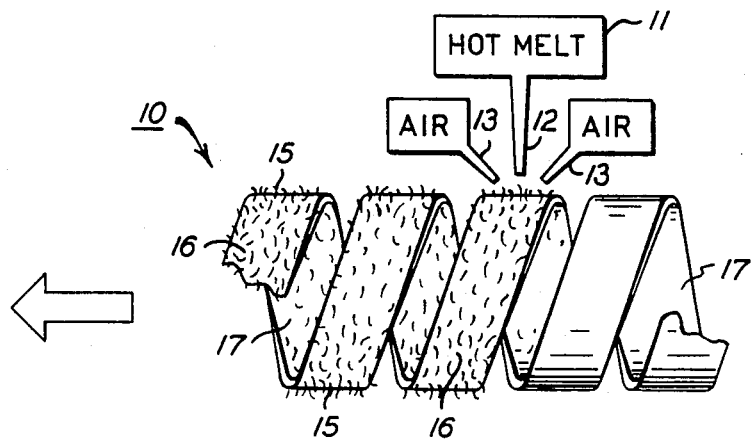
FIG. 1 is a fragmentary and partially schematic view of a preferred way of spraying hot melt adhesive on the convolutions of a rotationally tensioned window balance spring, as the spring is being wound.
Figure 5:
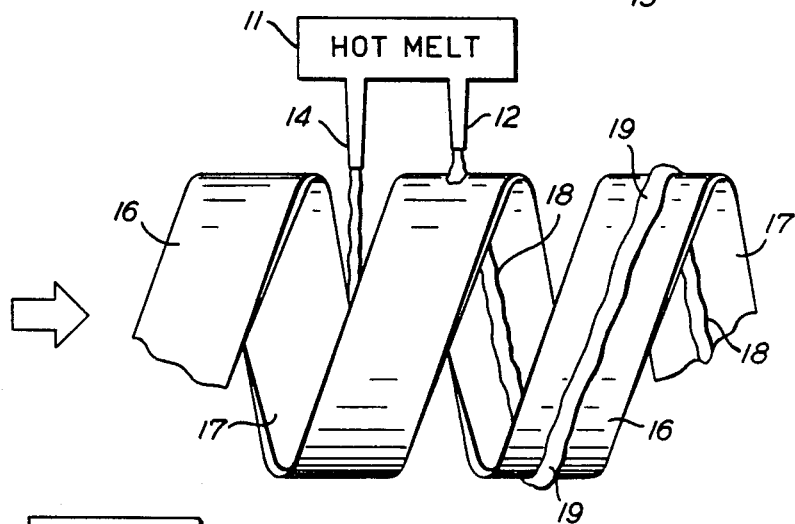
FIG. 5 is a fragmentary and partially schematic view, similar to the view of FIG. 4, showing hot melt sprayed as a bead adhered to inner and outer surfaces of a spring.

As shown schematically in FIG. 1, I spray a hot melt adhesive 11 against an outer surface 16 of a helical spring 10, preferably as its convolutions are being wound. Although the spray can be delivered as a bead, as shown in FIG. 5, I prefer that the adhesive be sprayed on outer spring surface 16 so that the adhesive breaks into a multitude of filaments 15 interlaced with each other as they land on and bond to spring 10.

The hot melt adhesive 11 is a thermoplastic polymer that can be a variety of materials. The hot melt I prefer is an ethylene vinyl acetate; but there are many thermoplastic hot melt adhesives that may work as well.

One requirement for the hot melt is that it form a secure bond with the metal surface of the spring material. Since spring metal is often oily when it arrives for winding into springs, it is important that the hot melt adhesive be able to bond securely to an oily metal surface. It is also possible to wipe the metal surface as the spring is being wound, to remove excess oil and help the hot melt bond to the metal surface.

Figure 2:
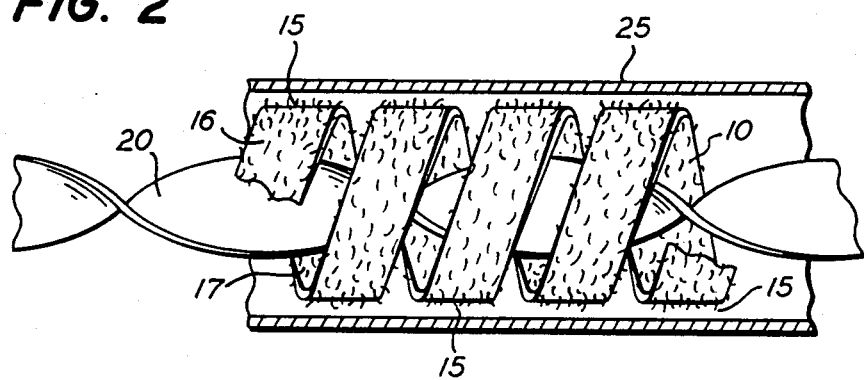
FIG. 2 is a fragmentary view of the spring of FIG. 1 enclosed within a spring tube and surrounding a twisted rod.

Spray systems for hot melt 11 are generally known. The spray that forms filaments 15 involves an adhesive nozzle 12 surrounded by several compressed air jets 13, aimed to make the adhesive swirl as it is sprayed. This breaks the adhesive into a multitude of filaments 15 that are interlaced with each other in a thinly felted manner. Some of the filaments 15 also extend outward from the surface 16 of spring 10, and a minor portion of the filaments extend across gaps between spring convolutions and penetrate into the interior of spring 10 between the convolution gaps. The interlaced filaments 15 that extend into the interior of spring 10 are interposed between inner spring surface 17 and a twisted rod 20 that is assembled within spring 10, inside of spring tube 25, as shown in FIG. 2. This deadens any rattle sound between inner spring surface 17 and twisted rod 20, while filaments 15 on outer spring surface 16 deaden rattle sound between spring 10 and tube 25.

The interlaced hot melt filaments 15 look like a tangled cobweb spread over the outer surface 16 of spring 10, occasionally bridging the gap between spring convolutions, and partially extending into the interior of spring 10. The spray system that produces this was originally devised for spreading hot melt adhesive in a predetermined width, in a very thin layer, over a laminate to be bonded to another laminate. In my usage, the hot melt does not bond anything to the spring, but the sprayed deposition works well in applying hot melt in a pattern of interlaced filaments 15 that deadens vibrational sound. I prefer that interlaced filaments 15 be deposited on spring 10 to a depth of 0.002 to 0.005 inches, although the interlacing of filaments 15 makes their depth difficult to measure.

Figure 3:
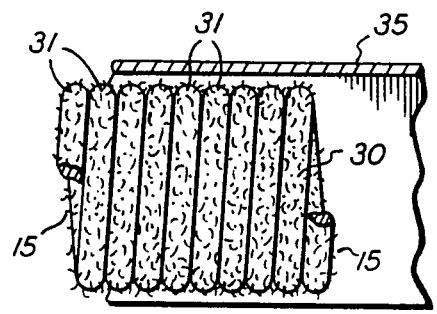
FIG. 3 is a fragmentary and partially cross-sectioned view of a tension spring that received a hot melt adhesive according to my invention and is enclosed within a jamb liner spring cover.

As shown in FIG. 3, tension spring 30, wound with contiguous convolutions 31, and enclosed within jamb liner spring cover 35, can also have a sound deadening coating of hot melt 11. This is preferably sprayed on the outer surface of convolutions 31, as spring 30 is wound. Since convolutions 31 touch each other, no hot melt 11 penetrates into the interior of spring 30, and none is needed there, since nothing is assembled inside of spring 30. All of the interlaced filaments 15 are then disposed between the outer surfaces of convolutions 31 and the inner surface of spring cover 35 to muffle any rattle sounds as spring 30 vibrates within cover 35.

Figure 4:
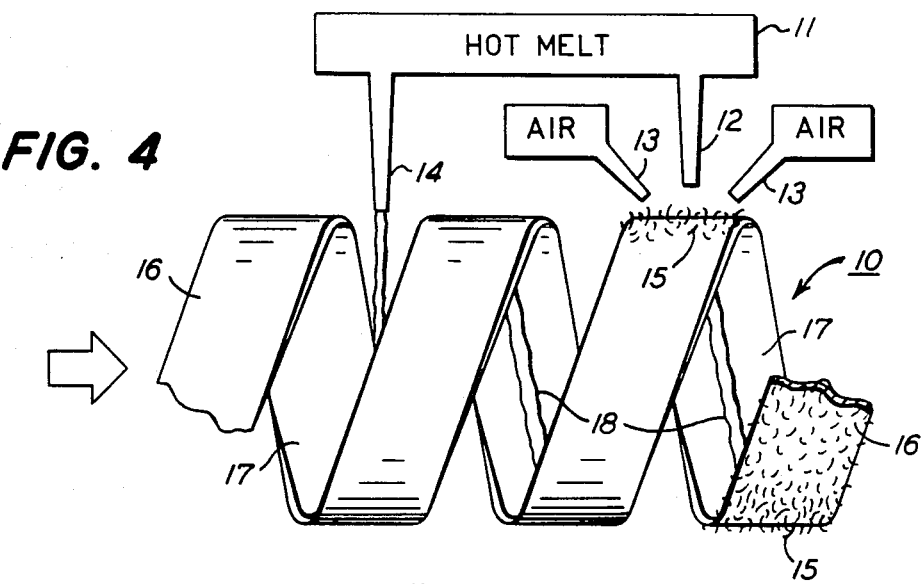
FIG. 4 is a fragmentary and partially schematic view, similar to the view of FIG. 1, showing the spraying of a hot melt adhesive bead onto an inner surface of a spring.

Instead of relying on a portion of interlaced filaments 15 extending into the interior of spring 10 to deaden vibration against twisted rod 20, as shown in FIGS. 1 and 2, it is possible to apply a bead 18 of hot melt adhesive 11 to interior spring surface 17, as shown in FIG. 4. This is done by a separate nozzle 14 that is not surrounded by air jets 13 and is disposed to direct bead 18 through a gap between spring convolutions so that it adheres to inner spring surface 17. Bead 18 is then interposed between inner spring surface 17 and twisted rod 20 to deaden any vibrational contact between these two components. Bead 18 tends to be a little thicker than interlaced filament 15, and bead 18 must be made thin enough to allow clearance room around rod 20.

The outer surface 16 of spring 10 can also be sound deadened by a bead 19 of hot melt adhesive, instead of interlaced filament 15. As shown in FIG. 5, inner surface 17 is sound deadened by a bead 18 deposited by hot melt nozzle 14; and outer surface 16 is sound deadened by a similar adhesive bead 19, deposited from hot melt nozzle 12. Bead 19 is interposed between spring 10 and the inside of spring tube 25 (shown in FIG. 2), and bead 18 is interposed between the inside of spring 10 and twisted rod 20 (also shown in FIG. 2). The sound deadening effect from beads 18 and 19 is similar to the effect of interlaced filament 15, except that beads 18 and 19 tend to be thicker than filaments 15.

Figure 6:
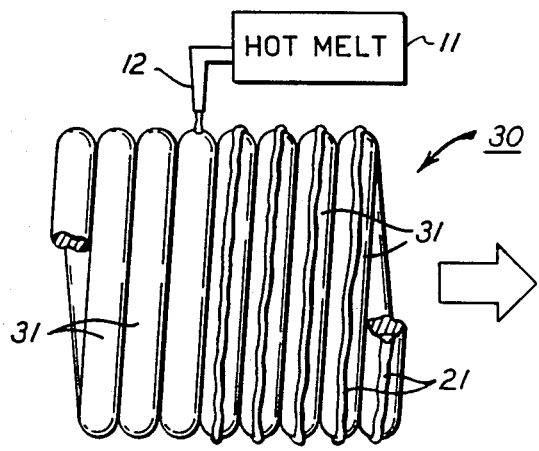
FIG. 6 is a fragmentary and partially cross-sectioned view, similar to the view of FIG. 3, showing hot melt adhesive sprayed as a bead on an outer surface of convolutions of a tension spring.

Coiled tension spring 30 can have the outer surface of its convolutions 31 sound deadened by a bead 21 of hot melt adhesive 11, delivered from a nozzle 12, as shown in FIG. 6. Bead 21 is preferably centered on the outer surface of each convolution 31, as illustrated, so as to be interposed between spring 30 and jamb liner spring 35 (shown in FIG. 3). Bead 21 has a similar sound deadening effect to interlaced filaments 15 and is preferably applied as spring 30 is wound, as shown in FIG. 6.

I claim:

1. A sound deadened window counterbalance spring comprising:
   a. a spring cover arranged around said window counterbalance spring;
   b. a thermoplastic hot melt adhesive adhered to an outward facing surface of said window counterbalance spring;
   c. said thermoplastic hot melt adhesive covering a covered portion of said outward facing surface of said window counterbalance spring, and leaving uncovered a bare portion of said outward facing surface of said window counter-balance spring; and
   d. said thermoplastic hot melt adhesive on said outward facing surface of said window counter-balance spring being interposed between said spring cover and said outward facing surface of said window counterbalance spring to deaden any rattle sound resulting from contact between said outward facing surface of said window counterbalance spring and an inward facing surface of said spring cover.

2. The sound deadened spring of claim 1 wherein said thermoplastic hot melt adhesive is formed as a bead adhered to said covered portion of said outward facing surface of said window counterbalance spring.

3. The sound deadened spring of claim 1 wherein said thermoplastic hot melt adhesive is also adhered to a portion of an inward facing surface of said window counterbalance spring where said thermoplastic hot melt adhesive is interposed between said window counterbalance spring and a twisted rod that said window counterbalance spring surrounds, to deaden any rattle sound resulting from contact between said inward facing surface of said window counterbalance spring and said twisted rod within said window counterbalance spring.

4. The sound deadened spring of claim 3 wherein said thermoplastic hot melt adhesive is formed as a bead.

5. The sound deadened spring of claim 1 wherein said thermoplastic hot melt adhesive is broken into a multitude of filaments interlaced with each other and bonded to said spring so that regions of bonding of said filaments to said spring constitute said covered portion of said outward facing surface.

6. The sound deadened spring of claim 5 wherein said window counterbalance spring is a rotationally tensioned helical spring surrounding a twisted rod, and a portion of said thermoplastic hot melt adhesive filaments are interlaced on an inward facing surface of said window counterbalance spring to be interposed between said window counterbalance spring and said rod.

7. The sound deadened spring of claim 5 wherein said thermoplastic hot melt adhesive is also adhered to an inward facing surface of said window counterbalance spring where said thermoplastic hot melt adhesive is interposed between said window counterbalance spring and a twisted rod that said window counterbalance spring surrounds.

8. The sound deadened spring of claim 1 wherein said spring cover is a tube.

9. A sound deadener applied to a window counterbalance spring, said sound deadener comprising:
   a. a thermoplastic hot melt adhesive adhered to an outward facing surface of said window counterbalance spring so that said thermplastic hot melt adhesive covers only a portion of said outward facing surface of said window counterbalance spring;
   b. a spring cover arranged around said outer surface of said window counterbalance spring; and
   c. said thermoplastic hot melt adhesive being interposed between said outward facing surface of said window counterbalance spring and an inward facing surface of said spring cover so that said thermoplastic hot melt adhesive deadens any rattle sound resulting from contact between said outward facing surface of said window counterbalance spring and said inward facing surface of said spring cover.

10. The sound deadener of claim 9 wherein said thermoplastic hot melt adhesive is formed as a bead adhered to said covered portion of said outward facing surface of said window counterbalance spring.

11. The sound deadener of claim 9 wherein said thermoplastic hot melt adhesive is also adhered to a portion of an inward facing surface of said window counterbalance spring where said thermoplastic hot melt adhesive is interposed between said window counterbalance spring and a twisted rod that said window counterbalance spring surrounds, to deaden any rattle sound resulting from contact between said inward facing surface of said window counterbalance spring and said twisted rod within said window counterbalance spring.

12. The sound deadener of claim 11 wherein said thermoplastic hot melt adhesive is formed as a bead.

13. The sound deadener of claim 12 wherein said spring cover is a tube.

14. The sound deadener of claim 9 wherein said thermoplastic hot melt adhesive is broken into a multitude of filaments interlaced with each other and bonded to said spring so that regions of bonding of said filaments to said spring constitute said covered portion of said outward facing surface.

15. The sound deadener of claim 14 wherein said window counterbalance spring is a rotationally tensioned helical spring surrounding a twisted rod, and a portion of said thermoplastic hot melt adhesive filaments are interlaced on an inward facing surface of said window counterbalance spring to be interposed between said window counterbalance spring and said rod.

16. The sound deadener of claim 14 wherein said thermoplastic hot melt adhesive is also adhered to an inward facing surface of said window counterbalance spring where said thermoplastic hot melt adhesive is interposed between said window counterbalance spring and a twisted rod that said window counterbalance spring surrounds.

17. The sound deadener of claim 9 wherein said spring cover is a tube.

* * * * *